United States Patent
Pieri et al.

[11] Patent Number: 6,166,377
[45] Date of Patent: Dec. 26, 2000

[54] INFRARED IMAGE SENSOR WITH INCORPORATED FUNCTIONS

[75] Inventors: Silvano Pieri; Mauro Magnani; Monica Olivieri, all of Florence, Italy

[73] Assignee: Finmeccanica S.p.A. Ramo di Azienda Alenia Difesa, Rome, Italy

[21] Appl. No.: 09/142,968

[22] PCT Filed: Mar. 20, 1997

[86] PCT No.: PCT/IT97/00063

§ 371 Date: Sep. 18, 1998

§ 102(e) Date: Sep. 18, 1998

[87] PCT Pub. No.: WO97/36420

PCT Pub. Date: Oct. 2, 1997

[30] Foreign Application Priority Data

Mar. 26, 1996 [IT] Italy ................................ FI96A0059

[51] Int. Cl.[7] .................................................. H04N 3/09
[52] U.S. Cl. ...................... 250/252.1; 250/332; 250/333; 250/334
[58] Field of Search .................... 250/332, 333, 250/334, 252.1

[56] References Cited

U.S. PATENT DOCUMENTS

| | | | |
|---|---|---|---|
| 4,280,050 | 7/1981 | Callender et al. | 250/330 |
| 4,349,843 | 9/1982 | Laakmann et al. | 358/206 |
| 4,419,692 | 12/1983 | Modisetter et al. | 358/113 |
| 4,452,517 | 6/1984 | Kohayakawa | 351/206 |
| 4,574,197 | 3/1986 | Kliever | 250/334 |
| 4,576,432 | 3/1986 | Ruger | 250/334 |
| 4,707,736 | 11/1987 | de Virel | 358/113 |
| 4,983,837 | 1/1991 | Cooper et al. | 250/334 |
| 5,655,171 | 8/1997 | Machida et al. | 396/535 |

FOREIGN PATENT DOCUMENTS

| | | |
|---|---|---|
| 0 365 948 A1 | 5/1990 | European Pat. Off. . |
| 0 367 481 A2 | 5/1990 | European Pat. Off. . |
| 0 459 010 A2 | 12/1991 | European Pat. Off. . |
| 1 418 919 | 12/1975 | United Kingdom . |
| 1 562 872 | 3/1980 | United Kingdom . |
| 2 100 548 | 12/1982 | United Kingdom . |

*Primary Examiner*—Constantine Hannaher
*Assistant Examiner*—Otilia Gabor
*Attorney, Agent, or Firm*—McGlew and Tuttle, P.C.

[57] ABSTRACT

An infrared image sensor, in particular one of the interlaced parallel scanning type, is described. The infrared image sensor has an optical focusing system for focusing an image on a matrix of sensitive elements (55) for the detection of the image. A collimator unit (5) forms a focal plane. The collimator unit is disposed at the entry of the sensor. At least one thermal reference (33), whose image is projected on the matrix (55), is disposed on the optical path of the image inside the sensor.

17 Claims, 6 Drawing Sheets

INFRARED IMAGE SENSOR WITH INCORPORATED FUNCTIONS

TECHNICAL FIELD

The present invention relates to an infrared image sensor of the type comprising an optical transmission system for focusing an image on a matrix of sensitive elements for detecting the image.

BACKGROUND ART

The sensor in question is an optical, mechanical and electronic device capable of detecting the temperature distribution of an infrared image formed by an objective which operates in the 8–12 micrometer spectral band.

Infrared image sensors are known (e.g. from EP-A-0 367 481), which include: an optical focusing system to focus an image on a matrix of sensitive elements for the detection of said image; a focal plane disposed at the entry of said sensor where an infrared image is formed, a collimator unit, a reimaging optics, and at least one thermal reference on said focal plane, whose image is projected on said matrix (55).

The possibility of detecting the thermal image of a target is dependent on the availability of electro-optical components which are sensitive to such radiation and whose sizes and number of elements are adequate to supply the necessary detail of the image.

At the present time, one-dimensional rows of elements, called "arrays", are used to detect the infra-red image in this spectral band; they only permit the detection of a single row of image elements (pixels) at one time. The whole frame of the image may be reconstructed over a period of time, by moving the array over it by means of an optical scanning system. Usually, there are empty spaces between the detecting elements of the array, necessitating a second micro-scanning movement, called an interlacing movement. This movement takes place at the end of each scanning operation, in a direction orthogonal to it, and causes a displacement of the array equal to half the distance between two adjacent elements. In this way, the whole surface of the image is detected in two scanning operations (half-frames). The assembly of sensitive elements which form the array is contained in a sealed container which, in order to increase the sensitivity of the detectors, is kept at a temperature of approximately −200° C. The cold casing which encloses the array has a circular aperture in front of the array, called a cold filter, through which passes the infrared radiation which forms the thermal image. Said filter forms the entry aperture of all the elements of the array. The image of the aperture diaphragm, called the exit pupil, of the optical system which forms the infrared image is usually conjugate on this filter.

The detection of the infrared image consists in a succession of electrical signals emitted by each detector element, the intensity of these signals being a function of the temperature detected in the image. These signals, when suitably processed electronically, may be used to control a television set which reconstructs a visible representation of the infrared image.

The electronic processing of the signals requires the comparison of these signals with a known temperature reference, in order to calibrate their response on a scale of absolute temperature. Usually, this reference is provided by mechanical elements disposed at the sides of the image on a focal plane inside a telescope which is disposed in front of the image sensor itself. This telescope is designed each time according to the specific application and does not form part of the infrared sensor. Essentially, therefore, the thermal references are outside the sensor and form part of the optical system located in front of the sensor itself.

The thermal reference elements are kept at controlled predetermined temperatures, and are detected together with the image during scanning, by a suitable extension of the path beyond the useful width of the image.

The infrared radiation originating from the object or scene which is observed through a suitable telescope which changes the enlargement with which it is seen by the sensor. As mentioned above, this telescope is not an integral part of the sensor. Its characteristics depend on the specific requirements of the application which uses the sensor. The sensor itself receives the beam re-collimated by the telescope and consists of the scanning devices and the optical system for focusing on the array of sensors. At the present time, automatic focusing systems which keep the image in focus when the ambient temperature varies are disposed in the objective in addition to the thermal references mentioned above. These automatic focusing systems are necessary because the refraction coefficient of the material used for the optical systems in the far infrared (typically germanium) varies considerably with the temperature, as a consequence of the variation of the density of the material.

This gives rise to a number of problems which will be clarified in the following text, and which are overcome by the present invention.

OBJECTS AND DISCLOSURE OF INVENTION

A first object of the present invention is to provide a sensor for infrared images which is more easily used, and which can be coupled in a simple way to a plurality of optical systems and objectives according to the various applications.

Another object of the present invention is to eliminate or reduce the interfaces between the image sensor and the objective located in front of it, thus making the design and installation of the optical systems easier.

A further object of the present invention is to provide a sensor for infrared images which makes it possible to have one, or preferably two, or even more thermal references which can be kept at any temperature without problems of formation of condensation or ice on the reference.

The object of the invention is also to provide a sensor for infrared images which is capable of maintaining the focus of the image with a variation of ambient temperature and consequently of the temperature of the objective located in front of the sensor, without the necessity of providing automatic focusing means on the objective itself.

The object of an improved embodiment of the invention is also to provide a sensor for infrared images with means capable of keeping the image of the thermal references in focus, thus minimizing the extension of the path required for their detection and maximizing the scanning efficiency.

These and further objects and advantages, which will be evident to those skilled in the art from a reading of the following text, are achieved essentially with an image sensor of the type mentioned above, wherein a focussing means is combined to the collimator unit, said focussing means controlling a focussing movement of said collimator unit, and wherein at least one thermal reference is arranged in said focal plane and moves integral with said collimator unit during the focussing movement.

Essentially, therefore, according to the invention two functions which are normally associated with the telescopes outside the sensor, and which therefore are normally designed each time according to the application, are housed inside the sensor. More particularly, the functions disposed inside the sensor are, in addition to the thermal reference (single or double), the collimator unit, with which an automatic and servo-assisted focusing system may be associated.

According to the present invention, the conventional division between the application-specific telescope and the sensor which contains only the essential elements for detection is also modified. According to the invention, the re-collimation unit of the telescopes is incorporated as an integral part of the sensor. In this way, the application-specific part becomes a focusing objective, while the sensor no longer receives collimated radiation, but an image formed by said objective on a plane called the "entry focal plane".

In a particularly advantageous embodiment of the invention, the thermal reference is disposed in a sealed chamber fitted on the optical path inside the sensor. This sealed chamber may advantageously be delimited in entry and exit by a first and a second lens respectively, forming part of the entry collimator. By disposing the thermal reference in a sealed chamber it is possible to avoid the formation of ice on the thermal reference at low temperatures.

In a particularly advantageous embodiment of the invention, the collimator unit is associated with focusing means controlled by a temperature sensor which detects the temperature of the objective located in front of the sensor, in other words the ambient temperature. In practice, the collimator unit is carried by a support containing the collimating optical system which is slidable by means of a guide member and controlled by a focusing servo mechanism.

The sensor comprises, in a known way, a scanning mirror and an interlacing mirror, to enable a complete image to be reconstructed by means of a linear matrix of sensitive elements.

In an improved embodiment of the invention, the optical focusing system disposed between the collimator and the matrix of sensitive elements is associated with an automatic focusing system to keep the thermal reference images in focus when the temperature of the sensor varies. The focusing system may be a servo-assisted system, or preferably a system of the passive type. In the latter case, it may have a member with a high coefficient of thermal expansion, for example a polycarbonate bar, one of whose ends is integral with the body of the sensor, while the opposite end is integral with a support of an optical element of the optical focusing system. The elongation and shrinkage of the member with a high coefficient of thermal expansion causes a corresponding displacement of the lens associated with it, and consequently an automatic compensation of the variation of the refractive index of the lenses of the optical focusing system with the variation of their temperature.

Further advantageous characteristics and embodiments of the invention are indicated in the attached dependent claims and are illustrated in greater detail in the following text with reference to an embodiment provided by way of example.

BRIEF DESCRIPTION OF THE DRAWINGS

The invention will be more clearly understood from the description and the attached drawing, which shows a practical and non-restrictive example of the invention. In the drawing.

DETAILED DESCRIPTION OF AN EMBODIMENT OF THE INVENTION

Figure 1:
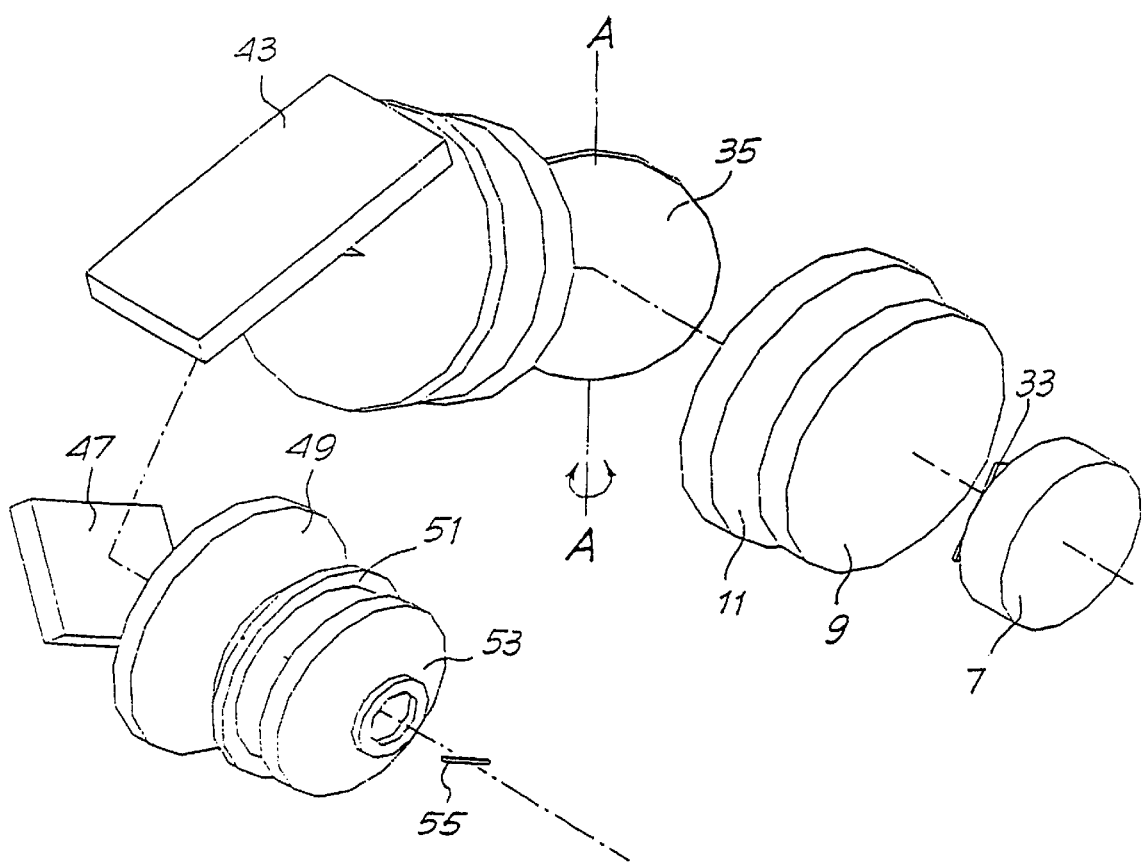
FIG. 1 is an axonometric diagram of the optical elements of the device.

To facilitate the understanding of the disposition of the optical systems of the device, FIG. 1 provides an axonometric view of the spatial disposition, in isolation from the mechanical parts of the device, of all the optical systems (lenses and mirrors) of the device.

Figure 6:
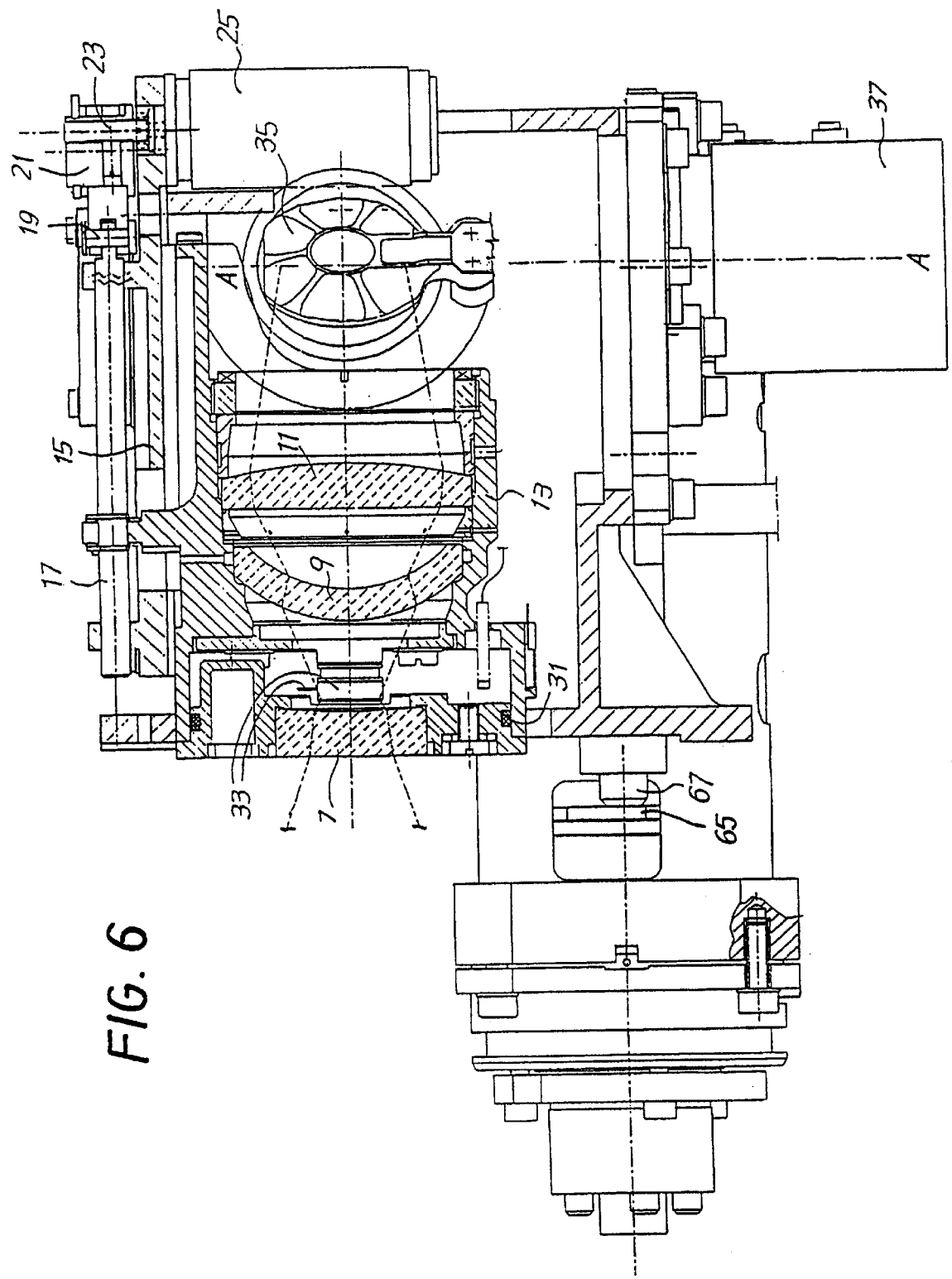
FIG. 6 is a partial sectional view through the line VI—VI in FIG. 2.

The sensor has an entry plane 3 (FIG. 2) to be coupled to the external objective which is not the object of the present invention and which is designed each time according to the specific applications of the sensor. The plane 3 therefore represents the entry side of the sensor. A collimator unit, indicated in a general way by 5, and having a first lens 7, a second lens 9 and a third lens 11 is disposed here. The lenses 7, 9 and 11, representing the optical systems for collimating the beam entering the sensor, are carried on a support 13 guided in a guide 15 (FIG. 6) and fixed to a rod 17 which is connected through a joint 19 to an eccentric 21 associated with a shaft 23 of a focusing motor 25.

Figure 2:
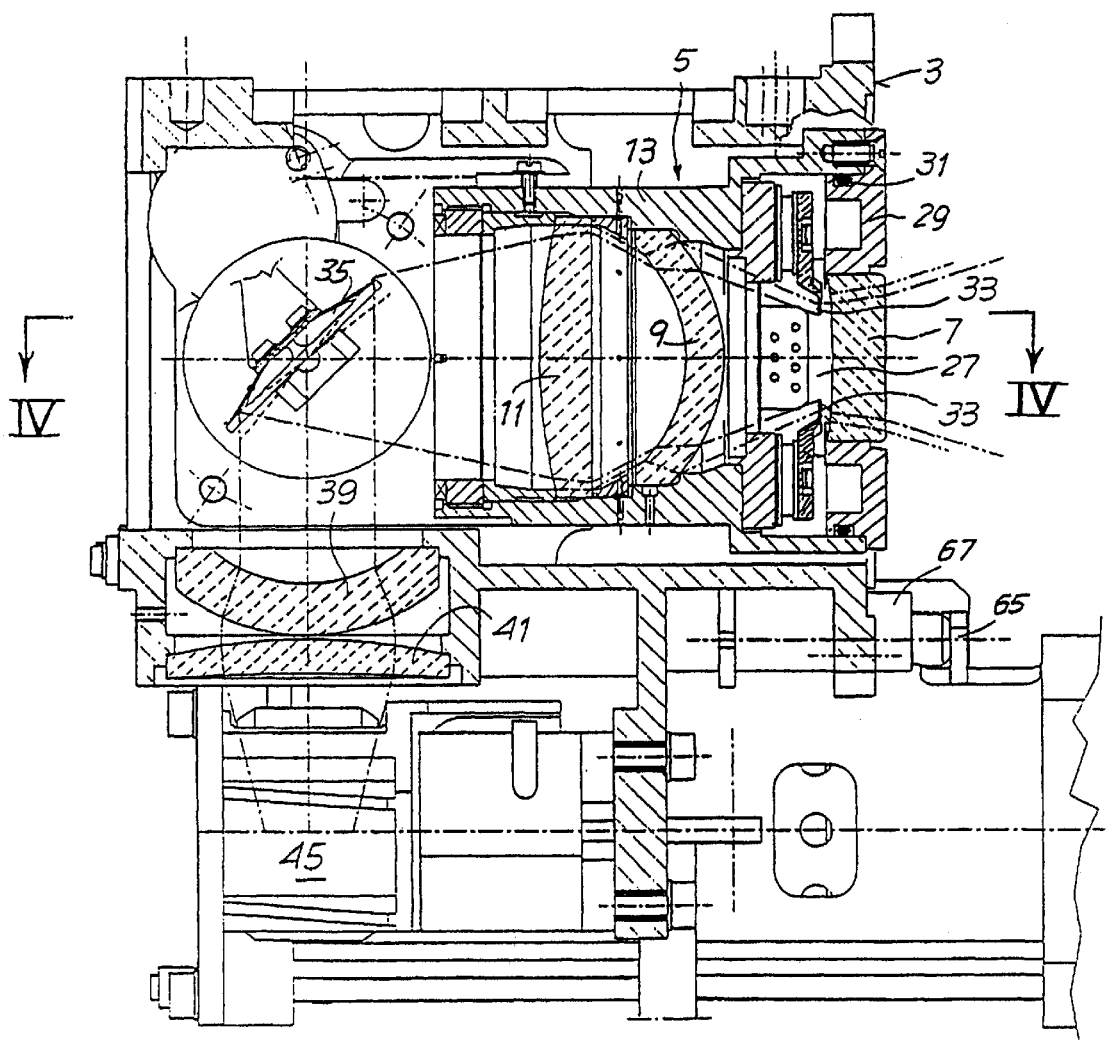
FIG. 2 is a partial section through the indicating line II—II in FIG. 5.
Figure 3:
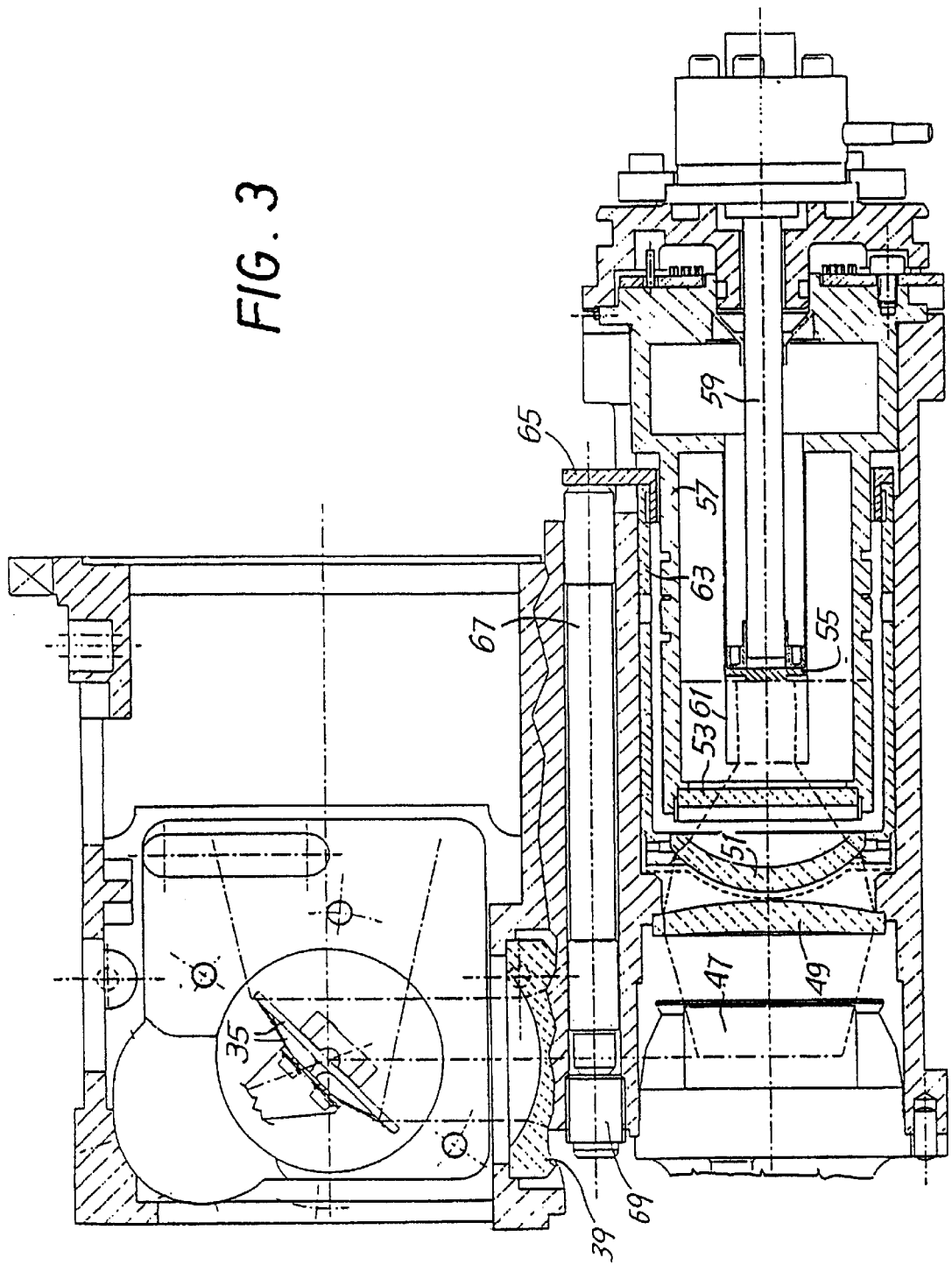
FIG. 3 is a partial section through the indicating line III—III in FIG. 5.
Figure 4:
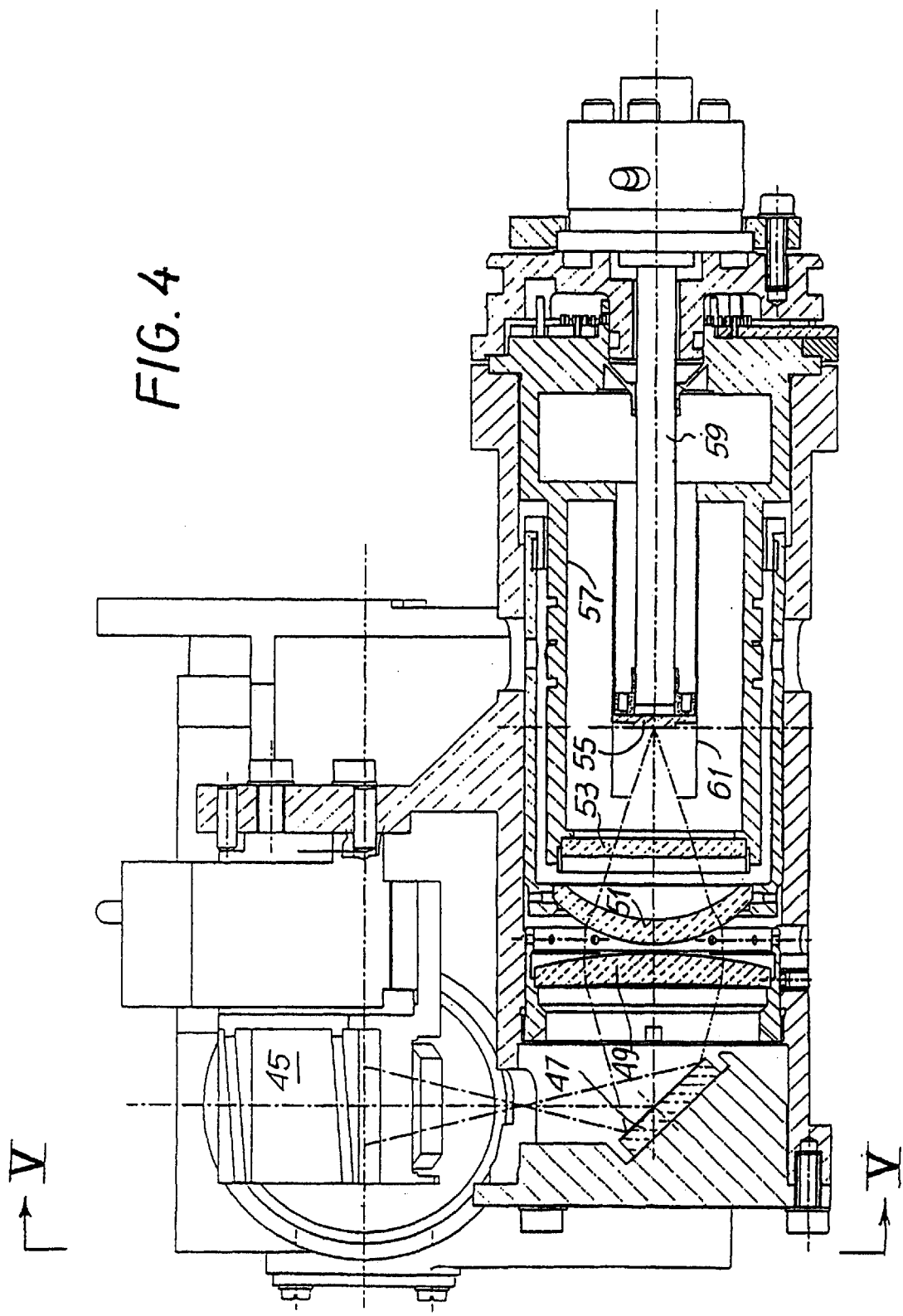
FIG. 4 is a partial section through the indicating line IV—IV in FIG. 5.

The lenses 7 and 11 are mounted in such a way that they form a sealed chamber 27 between them (FIG. 2). This is achieved by having the lens 7 mounted on a flange 29 fixed to the support 13 with the interposition of a seal 31, while the lens 11 is applied to the inside of the support 13 with a suitable insulating mastic or similar means.

Two metal plates 33 forming two thermal references of the sensor, each kept at a corresponding reference temperature, are disposed inside the sealed chamber 27. Typically, the two reference temperatures are chosen in such a way as to define a range according to the temperature of the scene observed by the sensor and in such a way that the temperatures of the various parts of the observed scene fall within the temperature range defined by the two thermal references. The temperature of the two thermal references is kept at controlled values in a way which is known and is not described.

The first lens 7 of the collimator intercepts the entering beam originating from the objective before it arrives on the entry focal plane, said focal plane being formed between the first lens 7 and the second lens 9 of the collimator unit, at the position of the plates 33 representing the thermal references. The entry focal plane thus forms a "virtual" plane with respect to the collimator.

Figure 5:
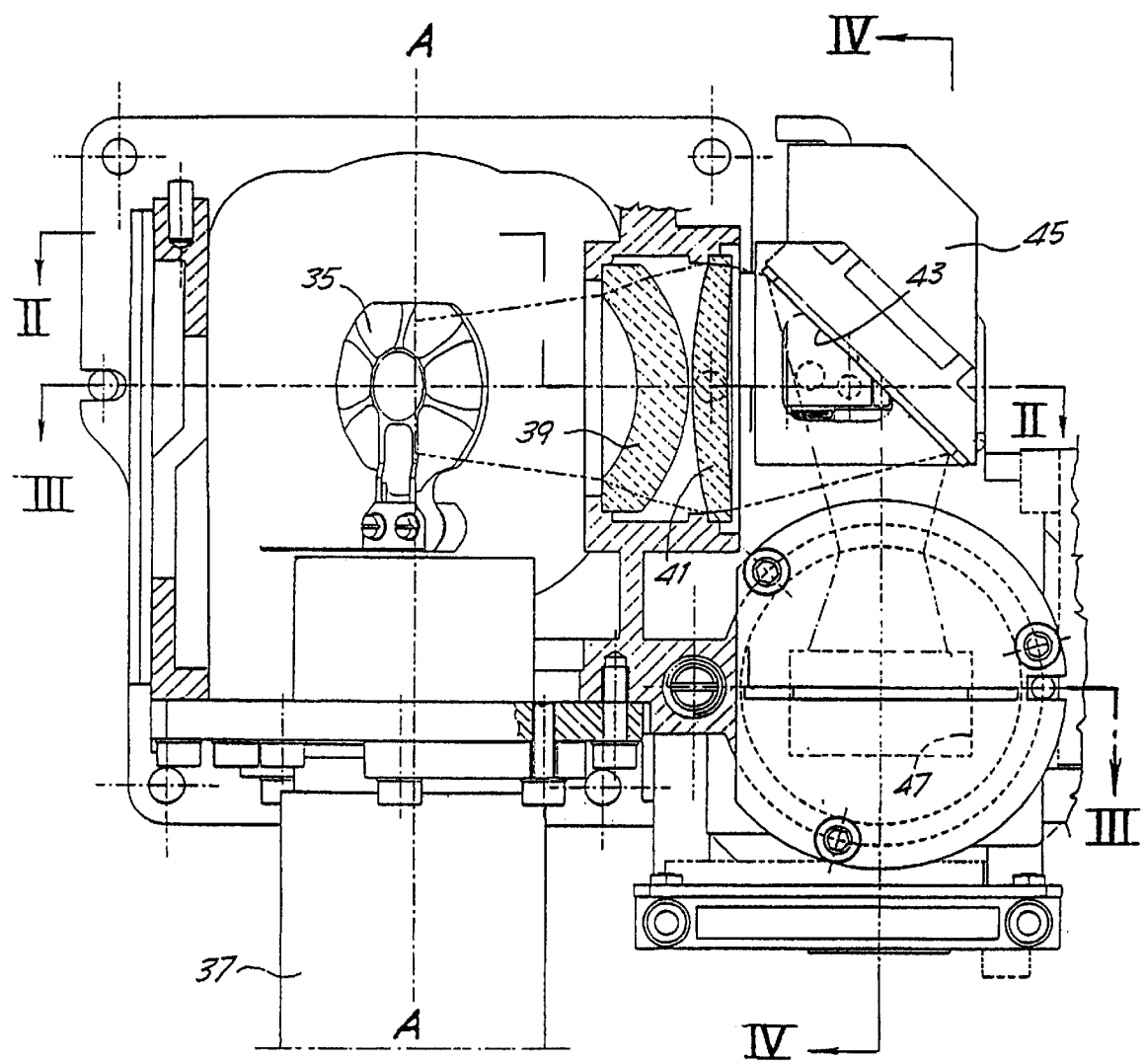
FIG. 5 is a rear view and partial section through the indicating line V—V in FIG. 4.

The collimated beam emerging from the collimator strikes a scanning mirror 35 provided with an oscillatory scanning movement about an axis A—A (FIGS. 5 and 6) imparted by an electric motor 37. By means of the scanning motion imparted by the electric motor 37 to the scanning mirror 35, successive points of the entry focal plane, which correspond to different directions of the collimated beam emerging from the collimator, are deflected in a single exit direction by the scanning mirror 35, which thus executes the scanning of the image.

The beam emerging from the scanning mirror 35 is received by an intermediate group of lenses 39, 41, forming part of the optical focusing system and disposed between the scanning mirror 35 and the sensitive elements for detecting the image, which will be described in the following text. On the optical path of the beam leaving the intermediate group of lenses 39, 41 there is disposed an interlacing mirror 43, orientated orthogonally to the scanning mirror 35 and mounted on a piezoelectric device 45 which can impart a small oscillatory movement, synchronized with the scanning rotation of the mirror 35, to the interlacing mirror. The amplitude of the oscillatory movement of the interlacing mirror is such that the image formed at the exit of the optical focusing system is displaced in a direction parallel to the matrix of sensitive elements by an amount equal to half the distance between two adjacent sensitive elements. The synchronization between the movement of the interlacing mirror 41 and the movement of the scanning mirror 35 is such that the entire scanning motion takes place alternately completely in one and completely in the other of the two extreme positions of the interlacing mirror 41.

The beam reflected by the interlacing mirror 41 is sent to a fixed mirror 47, which reflects the incident beam to a final group of lenses 49, 51 of the optical focusing system. The beam emerging from this final group of lenses passes through a window 53 which is transparent to infrared radiation and has flat parallel faces, and to a following filter 61 (cold filter), and then strikes a linear array or matrix 55 of sensitive elements disposed in the focal plane of the optical focusing system formed by the various lenses described above.

The matrix of sensitive elements 55 is housed inside a cold housing 57 kept at a temperature of approximately −200° C. by means of a cold finger 59 associated with a cryogenerator in a known way. The assembly of the elements 53, 55, 57, 59, 61 forms part of the detector device and is not the object of the present invention.

The matrix of sensitive elements disposed in the focal plane of the optical focusing system is orientated in such a way that its longitudinal direction is orthogonal to the direction of scanning. In this way, the length of the matrix determines the height of the detected surface, while the breadth of scanning determines the width. The scanning achieved with the scanning mirror 35 is broad enough additionally to project the image of the two thermal references 33 on the matrix of sensitive elements 55. In this way, in each scanning cycle the matrix also receives the image of two elements at known temperatures, which enable the individual sensitive elements to be calibrated in each cycle, so that correct information, and therefore a correct image of the observed scene, is always obtained.

As is known, optical systems for the far infrared, generally made of germanium, are subject to considerable variation of the refractive index with temperature. For this reason, the sensor described above is provided with the servo-assisted automatic focusing system using the motor 25 to compensate for the variation of the refractive index of the objective outside the sensor. An automatic focusing system of the passive type, described in the following text, is provided in order additionally to correct the variation with temperature of the refractive index of the lenses located inside the sensor between the collimator unit 5 and the array of sensitive elements.

The lens 51 of the final group of the optical focusing system is mounted on a sleeve 63 fixed by a bracket 65 to a first end of a bar 67 made of polycarbonate or other material with a high coefficient of thermal expansion. The opposite end of the bar 67 is fixed to a fixed point 69 of the structure containing the sensor. The bar 67 is kept at the temperature of the body of the sensor, which approximates closely to the temperature of the lenses 39, 41, 49 and 51 disposed inside the sensor. A variation of temperature causes a variation of the length of the bar 67, and therefore a displacement along the optical axis of the lens 51, with consequent automatic focusing obtained in a completely passive way, which compensates for the variation of the refractive index of the lenses of the optical focusing systems inside the sensor.

It is to be understood that the drawing shows only an example provided solely as a practical demonstration of the invention, and that this invention may be varied in its forms and dispositions without departure from the scope of the guiding concept of the invention. Any presence of reference numbers in the attached claims has the purpose of facilitating the reading of the claims with reference to the description and to the drawing, and does not limit the scope of protection represented by the claims.

What is claimed is:

1. Infrared image sensor, with an optical focusing system to focus an image on a matrix of sensitive elements for the detection of said image, said sensor comprising:
    a focal plane disposed at the entry of the sensor where an infrared image is formed;
    a collimator unit located between the focal plane and the matrix of sensitive elements;
    a reimaging optics
    at least one thermal reference arranged on said focal plane, an image of said thermal reference being projected on said matrix; and
    a focusing device provided combined with said collimator unit located between the focal plane and the matrix of sensitive elements, said focusing device controlling a focusing movement of said collimator unit, said at least one thermal reference being arranged in said focal plane and moving integrally with said collimator unit during said focusing movement.

2. Sensor according to claim 1, wherein said thermal reference is disposed in a sealed chamber inserted in said optical path.

3. Sensor according to claim 2, wherein said sealed chamber has an entry side and an exit side formed by a first and a second lens of said collimator unit respectively.

4. Sensor according to claim 2, wherein it comprises two thermal references kept at two different reference temperatures and positioned on the same plane.

5. Sensor according to claim 2, wherein said matrix of sensitive elements is a linear matrix, and a scanning mirror is disposed on the optical path of the image to be detected.

6. Sensor according to claim 5, wherein it further includes an interlacing mirror associated with a piezo-electric actuator.

7. Sensor according to claim 5, wherein said reimaging optics comprises an intermediate lens or group of lenses between said scanning mirror and an interlacing mirror and a final lens or group of lenses is provided between the interlacing mirror and said matrix of sensitive elements.

8. Sensor according to claim 7, wherein said collimator unit and said focusing means keep the infrared image detected in focus when the ambient temperature varies.

9. Sensor according to claim 8, wherein said collimator unit comprises a support containing the optical collimation system which is slidable by means of a guide member, and in that a focusing servo mechanism controls the sliding movement of said support.

10. Sensor according to claim 9, wherein said focusing servo mechanism is connected to said support by means of an eccentric system and a drive rod.

11. Sensor according to claim 10, wherein said optical focusing system is associated with a second focusing system to keep the image of the thermal reference in focus when the temperature of the sensor varies.

12. Sensor according to claim 11, wherein said second focusing system is a passive system.

13. Sensor according to claim 12, wherein said second focusing system comprises a member with a high coefficient of thermal expansion, one end of which is integral with the body of the sensor, while the opposite end is integral with a support carrying at least one lens of said optical focusing system.

14. Sensor according to claim 13, wherein said member with a high coefficient of thermal expansion is a polycarbonate bar.

15. Sensor according to claim 7, wherein said reimaging optics comprises an intermediate lens or group of lenses between the scanning mirror and the interlacing mirror and a final lens or group of lenses between the interlacing mirror and said matrix of sensitive elements.

16. An infrared image sensor, with an optical focusing system to focus an image on a matrix of sensitive elements for the detection of said image, said sensor comprising:

a focal plane disposed at the entry of said sensor where an infrared image is formed;

a collimator unit;

a reimaging optics;

at least one thermal reference on said focal plane, whose image is projected on the matrix;

a focusing device combined to said collimator unit, said focusing device controlling a focusing movement of said collimator unit, said at least one thermal reference being arranged in said focal plane and moving integrally with said collimator unit during said focusing movement; and a second focusing system to keep the image of the thermal reference in focus when the temperature of the sensor varies.

17. An infrared image sensor, comprising:

a collimator provided moveable with a focusing movement;

a first group of focusing lenses;

a second group of focusing lenses;

a matrix of infrared sensitive elements;

a focal plane arranged in a front portion of said collimator;

a thermal reference movable with said collimator to follow said focusing movement of said collimator;

a scanning mirror disposed between said collimator and said first group of focusing lenses;

an interlacing mirror disposed between said first group of focusing lenses and said second group of focusing lenses, said first and said second group of focusing lenses generating a focused infrared image on said matrix of infrared sensitive elements.

* * * * *